Oct. 26, 1965
J. J. HICKEY
3,214,696
RECTANGULAR PULSE GENERATING CIRCUIT
Filed Dec. 26, 1962
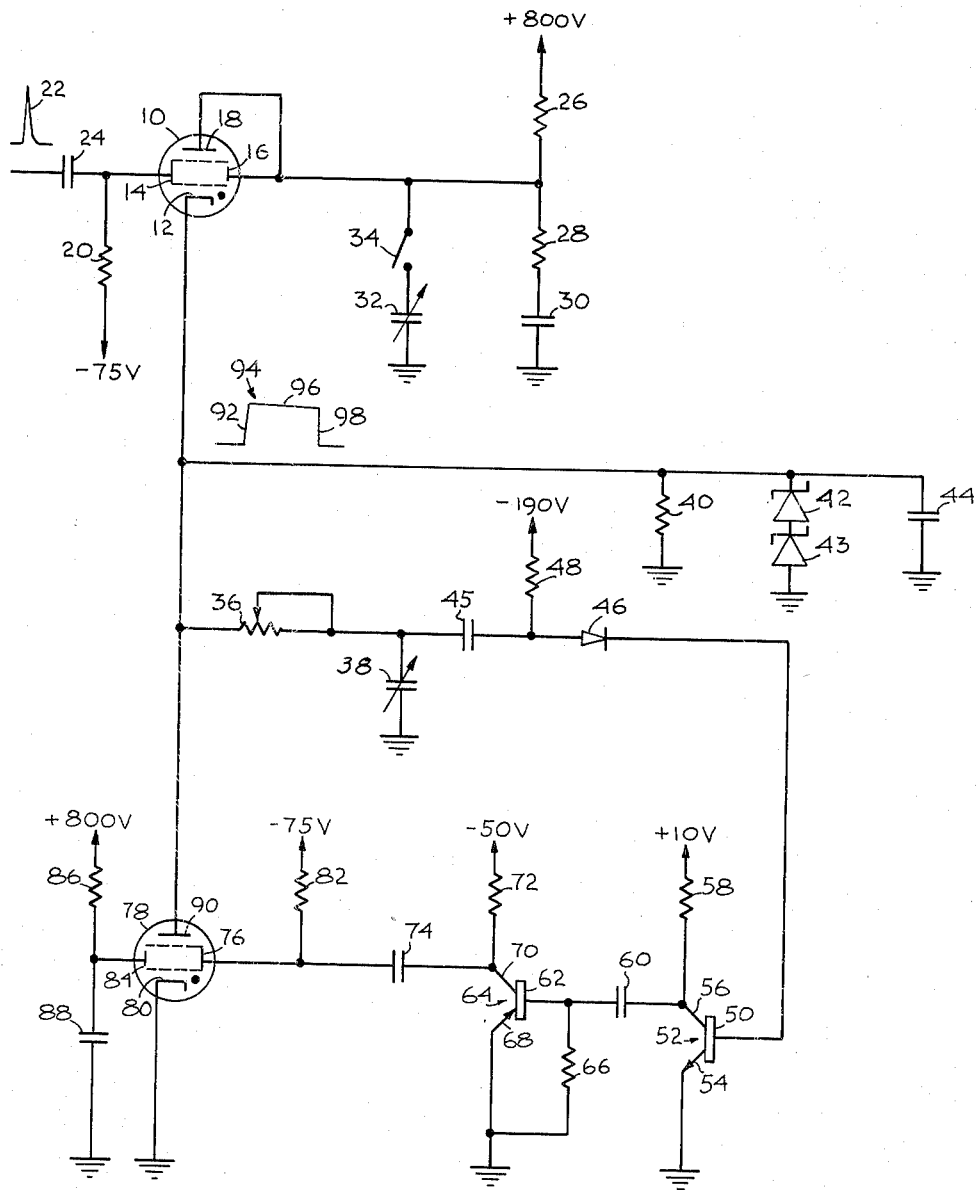
JOHN J. HICKEY
INVENTOR.
BY *Jerry A. Dinardo*
AGENT

United States Patent Office 3,214,696
Patented Oct. 26, 1965

3,214,696
RECTANGULAR PULSE GENERATING CIRCUIT
John J. Hickey, Hawthorne, Calif., assignor, by mesne assignments, to TRW Inc., a corporation of Ohio
Filed Dec. 26, 1962, Ser. No. 246,997
4 Claims. (Cl. 328—67)

This invention relates generally to pulse generating circuits, and more particularly to circuits capable of generating relatively high voltage rectangular pulses with minimum jitter.

An object of this invention is the provision of a rectangular pulse generating circuit capable of producing high voltage, flat topped pulses of accurately determined time duration, and having low impedance leading and trailing edges needed for driving capacitive loads, such as those encountered in image converter and cathode ray tubes.

A further object is the provision of a circuit capable of generating rectangular pulses of at least several hundred volts amplitude and easily controllable time duration covering a wide range.

Yet another object is the provision of a pulse generating circuit for producing high voltage rectangular pulses have rise and fall times on the order of 10 nanoseconds, durations in the range of 50 nanoseconds to several milliseconds and duration stability within 0.1%.

According to the invention a first discharge device provides a conducting path for the discharge of a first energy storage device. A portion of the discharge current flows through an output resistor to produce a steep rising wavefront in the output pulse that is limited to a desired amplitude by a voltage limiting device connected across the output resistor. Another portion of the discharge current flows through a charging circuit to charge a second energy storage device. Yet another portion of the discharge current flows into the capacitive load. While the second energy storage device is charging, the voltage across the output resistor remains limited to form the flat portion of the output pulse. The charging voltage on the second energy storage device is coupled to a back biased diode. When the charging voltage exceeds the voltage on the biased diode, the latter conducts current in series with a transistor trigger amplifier input circuit. The transistor trigger amplifier circuit couples an amplified trigger pulse to a second discharge device, connected across the output resistor, to render the second discharge device conducting and abruptly terminate the output pulse.

The single figure of the drawing is a schematic circuit illustrating an embodiment of the rectangular pulse generating circuit of the invention. There is shown a first electron discharge device or thyratron 10 having a cathode 12, a control electrode 14, a primary anode 16, and a secondary anode 18. In this embodiment the primary and secondary anodes 16 and 18 are connected together and the thyratron 10 is operated as a gas triode. The control electrode 14 is connected to a negative bias source of 75 volts through a bias resistor 20 so that the thyratron is normally nonconducting. The control electrode is adapted to receive a positive trigger pulse 22 through a coupling capacitor 24.

The primary anode 16 is connected through a charging resistor 26 to a positive potential of 800 volts. The primary anode 16 is also connected through a discharge circuit including a resistor 28 and a first energy storage device or capacitor 30 to ground. An additional capacitor 32 may be connected between the primary anode 16 and ground through a switch 34 when a relatively high capacitive load is to be driven by the generated pulse.

Between the cathode 12 and ground there is connected a charging circuit including a variable resistor 36 and a second energy storage device or variable capacitor 38. Also connected between the cathode 12 and ground are an output resistor 40 and a voltage limiter or Zener diodes 42 and 43. The desired rectangular pulse is generated in the cathode circuit and is used to drive a capacitive load 44 such as the grid circuit of an image converter tube or a cathode ray tube.

The capacitor 38 is coupled through a coupling capacitor 45 to a solid state diode 46 that is back biased to a negative potential of 190 volts through a resistor 48. The solid state diode is connected to the base 50 of an n-p-n transistor 52. The emitter 54 of the transistor 52 is grounded and the collector 56 is connected to a positive potential of 10 volts through a current limiting resistor 58.

The collector 56 of the transistor is coupled through a capacitor 60 to the base 62 of a p-n-p transistor 64. A resistor 66 is connected between the base 62 and the grounded emitter 68 of the transistor 64. The collector 70 of the transistor 64 is connected to a negative potential of 50 volts through a current limiting resistor 72.

The collector 70 is coupled through a capacitor 74 to the control electrode 76 of a second thyratron 78. The second thyratron 78 has its cathode 80 grounded and its control electrode 76 normally biased beyond cutoff by connection to a negative potential of 75 volts through a bias resistor 82. The primary anode 84 is connected to a positive potential of 800 volts through a resistor 86. A capacitor 88 is connected between the primary anode 84 and ground. The charge on capacitor 88 accelerates the initial ionization of the thyratron 78. The secondary anode 90 is connected directly to the cathode 12 of the first thyratron.

It should be noted that when a type 2D21 is used for the thyratrons 10 and 78, very fast switching speeds can be realized by connecting them in a nonconventional manner. For example, it is preferred to utilize as the control grid 14 or 76 the two part electrode which normally serves as the shield electrode and to utilize as the primary anode 16 or 84 the element that is normally used as the control grid.

The operation of the pulse generating circuit will now be described. In the quiescent state, the thyratrons 10 and 78 are biased sufficiently negative so that they are both nonconducting. The capacitor 30 of the discharge circuit is charged to the full supply potential of 800 volts. Since no current is flowing in the thyratron 10, the capacitor 38 in the charging circuit is uncharged. Further, both transistors 52 and 64 are nonconducting.

When a positive trigger pulse, say of 150 volts, is coupled to the control electrode 14 of the first thyratron 10, it raises the control grid 14 voltage above cutoff and causes the thyratron to conduct quickly. The conduction of the first thyratron 10 provides a path for the discharge of the capacitor 30 through the resistor 28. The discharge current flows through the parallel combination including the charging circuit of the variable resistor 36 and variable capacitor 38, the resistor 40, the load capacitor 44, and the Zener diodes 42 and 43. The current flowing into the load capacitor 44 gives rise to a relatively steep leading edge 92 in the rectangular output pulse 94. The steepness of the leading edge 92 is determined by the initial amplitude of the discharge current and the value of the load capacitance. An even steeper rise may be obtained by shunting the capacitor 30 and resistor 38, by capacitor 32, thereby increasing the initial discharge current. The amplitude of the output pulse 94 is quickly limited by the conduction of current through the Zener diodes to a predetermined level, in this case 300 volts, giving rise to the flat portion 96 of the pulse 94.

The portion of the discharge current flowing into the capacitor 38 causes the latter to charge towards the 300 volt potential across the Zener diodes 42 and 43, at a rate determined by the time constant of resistor 36 and capacitor 38. The rise in potential of the capacitor 38 is coupled through capacitor 45, to the back biased diode 46. So long as the potential of the capacitor 38 is insufficient to overcome the initial bias level of −190 volts on the diode 46, the output pulse 94 remains at the 300 volt level.

When the capacitor 38 potential exceeds the bias level on the diode 46, the diode 46 conducts current which flows between the base 50 and the emitter 54 of the transistor 52. The current is amplified first by transistor 52 and then by transistor 64. The voltage developed across resistor 72 in the output of transistor 64 is coupled through capacitor 74 to the control electrode 76 of the second thyratron 78. The coupled voltage is sufficient to overcome the bias on the thyratron 78, causing the latter to conduct. When the thyratron 78 conducts, it brings the secondary anode 90 thereof and thus the cathode 12 of the first thyratron 10 down to ground potential, giving rise to the steep trailing edge 98 and thereby terminating the output pulse 94.

The back bias of the diode 46 is preferably made equal to $$V_z\left(1-\frac{1}{\epsilon}\right)$$

where $V_z$ is the combined Zener voltage of the Zener diodes 42 and 43 and $\epsilon$ is the base of the natural logarithm. Thus the back bias of the diode 46 is approximately 63% of the combined Zener voltages. This will insure that the diode 46 will conduct at a time equal to 1RC time after the firing of the first thyratron 10, where RC is the product of resistor 36 and capacitor 38. This is important because the maximum slope at a given time $t$, of a waveform rising exponentially to a fixed amplitude, occurs when RC is equal to $t$. Maximizing the slope at the point where the diode conducts will minimize the time jitter of the circuit.

The RC time constant of the capacitor 38 and resistor 36 and thus the duration of the pulse 94 can be varied by changing the resistance value of the resistor 36 and the capacitance value of capacitor 38. The RC time constant of resistor 28 and capacitor 30 has to be long enough to sustain current through the Zener diodes 42 and 43 to maintain the limited value of voltage thereacross and across the charging circuit comprising resistor 36 and capacitor 38 for the duration of the output pulse 94.

The circuit of the invention has been successfully operated with the following circuit values:

| Component | Unit | Value |
|---|---|---|
| Thyratron 10 | | 2D21 |
| Resistor 20 | kilohms | 100 |
| Capacitor 24 | microfarads | .001 |
| Resistor 26 | megohms | 1 |
| Resistor 28 | kilohms | 5.1 |
| Capacitor 30 | microfarads | 0.1 |
| Capacitor 32 | picofarads | 0–30 |
| Resistor 36 | kilohms | 20 |
| Capacitor 38 | picofarads | 10–100,000 |
| Resistor 40 | kilohms | 100 |
| Diode 42 | | IN989B |
| Diode 43 | | IN989B |
| Capacitor 45 | microfarads | .01 |
| Diode 46 | | IN992B |
| Resistor 48 | megohms | 1 |
| Transistor 52 | | 2N706 |
| Resistor 58 | kilohms | 100 |
| Capacitor 60 | microfarads | .001 |
| Transistor 64 | | 2N721 |
| Resistor 66 | kilohms | 100 |
| Resistor 72 | do | 100 |
| Capacitor 74 | microfarads | .01 |
| Thyratron 78 | | 2D21 |
| Resistor 82 | kilohms | 100 |
| Resistor 86 | megohms | 1 |
| Capacitor 88 | picofarads | 30 |

While in the example shown and described, the circuit will generate a 300 volt pulse, it is possible, with certain minor changes in the values of the circuit components, to generate pulses up to a kilovolt.

The embodiments of the invention in which an exclusive property or privilege is claimed are defined as follows:

1. A rectangular pulse generating circuit, comprising a first energy storage device;
   means for charging said first energy storage device to a predetermined voltage in excess of the desired amplitude of said rectangular pulse;
   a discharge circuit in series with said first energy storage device and including a first switching means and a first resistor;
   said first switching means being adapted to be rendered conducting for causing said first energy storage device to discharge current through said first resistor to generate a first portion of said rectangular pulse;
   a voltage limiter comprising a Zener diode means connected in parallel with said first resistor for limiting the amplitude of said rectangular pulse;
   a charging circuit connected in parallel with said first resistor and including a second energy storage device adapted to be charged exponentially by discharge current from said first energy storage device;
   means responsive to the rising voltage on said second energy storage device for generating a pulse terminating signal when the rising voltage reaches a value equal to a predetermined fractional part of the pulse amplitude;
   a second switching means connected across said first resistor;
   and means for coupling said pulse terminating signal to said second switching means for terminating said rectangular pulse.

2. A rectangular pulse generating circuit, comprising a first energy storage device;
   means for charging said first energy storage device to a predetermined voltage in excess of the desired amplitude of said rectangular pulse;
   a discharge circuit in series with said first energy storage device and including a first switching means and a first resistor;
   said first switching means being adapted to be rendered conducting for causing said first energy storage device to discharge current through said first resistor to generate a first portion of said rectangular pulse;

a voltage limiter connected in parallel with said first resistor for limiting the amplitude of said rectangular pulse;

a charging circuit connected in parallel with said first resistor and including a second energy storage device adapted to be charged exponentially by discharge current from said first energy storage device;

means including a back biased diode responsive to the rising voltage on said second energy storage device for generating a pulse terminating signal when the rising voltage reaches a value equal to a predetermined fractional part of the pulse amplitude;

a second switching means connected across said first resistor;

and means for coupling said pulse terminating signal to said second switching means for terminating said rectangular pulse.

3. The invention according to claim 2, and further including a transistor amplifier circuit for amplifying the output of said diode.

4. The invention according to claim 2, and further including means for applying a reverse bias on said diode that is approximately equal to 63% of the pulse amplitude.

References Cited by the Examiner
UNITED STATES PATENTS

| | | | |
|---|---|---|---|
| 2,419,340 | 4/47 | Easton | 328—67 X |
| 2,686,262 | 8/54 | Wiley | 328—67 X |
| 2,892,101 | 6/59 | Bright | 307—88.5 |
| 3,027,515 | 3/62 | Clark et al. | 328—67 X |

OTHER REFERENCES

"The Capacitor," publication by Cornell-Dubilier Electric Corporation, vol. 25, No. 3 (pages 3 and 5 relied on), May-June 1960.

ARTHUR GAUSS, *Primary Examiner.*